US012682148B2

(12) United States Patent
Inukai

(10) Patent No.: US 12,682,148 B2
(45) Date of Patent: Jul. 14, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kyohei Inukai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 18/230,807

(22) Filed: Aug. 7, 2023

(65) Prior Publication Data

US 2024/0070377 A1 Feb. 29, 2024

(30) Foreign Application Priority Data

Aug. 30, 2022 (JP) .................................. 2022-137024

(51) Int. Cl.
*G06F 40/114* (2020.01)
*G06F 40/295* (2020.01)

(52) U.S. Cl.
CPC .......... *G06F 40/114* (2020.01); *G06F 40/295* (2020.01)

(58) Field of Classification Search
None
See application file for complete search history.

(56) References Cited

U.S. PATENT DOCUMENTS 6,885,481 B1 * 4/2005 Dawe ...................... G06Q 10/10
358/403
10,534,846 B1 * 1/2020 Sanghavi ............. G06V 30/414

11,295,175 B1 * 4/2022 Adeniran ............. G06V 30/414
2006/0101327 A1 * 5/2006 Mandelbaum ....... G06V 30/418
715/229
2020/0394396 A1 * 12/2020 Yanamandra ........ G06V 30/413

(Continued)

FOREIGN PATENT DOCUMENTS

JP 2001-028041 A 1/2001
JP 2005-208978 A 8/2005

OTHER PUBLICATIONS

A. Hamdi, M. Coustaty, A. Joseph, V. P. d'Andecy, A. Doucet and J.-M. Ogier, "Feature Selection for Document Flow Segmentation," 2018 13th IAPR International Workshop on Document Analysis Systems (DAS), Vienna, Austria, 2018, pp. 245-250 (Year: 2018).*

*Primary Examiner* — Frank D Mills

(74) *Attorney, Agent, or Firm* — Venable LLP

(57) ABSTRACT

An information processing apparatus including one or more memories storing instructions and one or more processors executing the instructions to obtain scanned images consisting of multiple pages by scanning a plurality of different documents collectively, to determine a break between the different documents in the scanned images, when a first document indicated by the page before the break and a second document indicated by the page after the break in the scanned images do not satisfy a predetermined condition indicating related documents, to divide the scanned images at the break to generate files so that the first and second documents are separated, and, when the first document and the second document, that is not the same document as the first, satisfy the predetermined condition, not to divide the scanned images at the break, to generate the file so that the first and second documents are included in one file.

13 Claims, 13 Drawing Sheets

(56)         References Cited

U.S. PATENT DOCUMENTS

| | | | |
|---|---|---|---|
| 2022/0138259 A1* | 5/2022 | Puzder | G06V 30/40 |
| | | | 707/738 |
| 2022/0300735 A1* | 9/2022 | Kelly | G06F 16/93 |
| 2022/0335218 A1* | 10/2022 | Bindana | H04N 1/00811 |

* cited by examiner

400

| PAIR OF TYPES OF DOCUMENTS | | NAMED ENTITY OF PRECEDING PAGE (DOCUMENT) | NAMED ENTITY OF LATER PAGE (DOCUMENT) |
|---|---|---|---|
| PRECEDING PAGE | LATER PAGE | | |
| ESTIMATE FORM | PURCHASE ORDER | DESTINATION ORGANIZATION NAME | ISSUING SOURCE ORGANIZATION NAME |
| ESTIMATE FORM | PURCHASE ORDER | DESTINATION PERSON NAME | ISSUING SOURCE PERSON NAME |
| DELIVERY SLIP | BILL | DESTINATION ORGANIZATION NAME | DESTINATION ORGANIZATION NAME |
| DELIVERY SLIP | BILL | DESTINATION PERSON NAME | DESTINATION PERSON NAME |
| DELIVERY SLIP | BILL | ISSUING DATE | ISSUING DATE |
| DELIVERY SLIP | BILL | TOTAL PRICE | TOTAL PRICE |
| BILL | RECEIPT | DESTINATION ORGANIZATION NAME | DESTINATION ORGANIZATION NAME |
| BILL | RECEIPT | DESTINATION PERSON NAME | DESTINATION PERSON NAME |
| BILL | RECEIPT | TOTAL PRICE | TOTAL PRICE |
| APPLICATION FORM | RECEIPT | APPLYING SOURCE ORGANIZATION NAME | DESTINATION ORGANIZATION NAME |
| APPLICATION FORM | RECEIPT | APPLYING SOURCE PERSON NAME | DESTINATION PERSON NAME |

| TYPE OF DOCUMENT | FIRST PRIORITY NAMED ENTITY | SECOND PRIORITY NAMED ENTITY |
|---|---|---|
| ESTIMATE FORM | PRODUCT NAME | ESTIMATED PRICE |
| PURCHASE ORDER | ISSUING SOURCE ORGANIZATION NAME | TOTAL PRICE |
| DELIVERY SLIP | PRODUCT NAME | DELIVERY DATE |
| ORDER RECEIPT | DESTINATION ORGANIZATION NAME | ISSUING DATE |
| BILL | TOTAL PRICE | PAYMENT DEADLINE |
| RECEIPT | DESTINATION ORGANIZATION NAME | TOTAL PRICE |
| APPLICATION FORM | APPLYING SOURCE ORGANIZATION NAME | APPLYING SOURCE PERSON NAME |

901 ~ (ESTIMATE FORM row)
902 ~ (PURCHASE ORDER row)

FIG.9

INFORMATION PROCESSING APPARATUS, INFORMATION PROCESSING METHOD, AND STORAGE MEDIUM

CROSS-REFERENCE TO PRIORITY APPLICATION

This application claims the benefit of Japanese Patent Application No. 2022-137024 filed Aug. 30, 2022, which is hereby incorporated by reference herein in its entirety.

BACKGROUND

Field

The present disclosure relates to processing to divide document group data.

Description of the Related Art

There has been an increase in a case of scanning a document stored in the form of paper and storing the document as digital data. For the digitalization of a document, there is a method in which data, including contents of multiple documents, such as a bill and a receipt obtained by scanning the multiple documents together are divided by the document unit and then digitalized.

Japanese Patent Laid-Open No. 2001-028041 describes a method of identifying an image of a front cover from a scanned image group in the page unit obtained by scanning multiple documents and dividing the scanned image group in the page unit based on the recognized image of the front cover.

Japanese Patent Laid-Open No. 2005-208978 describes a method of evaluating the likeliness to be a break between documents from a scanned image group in the page unit obtained by scanning multiple documents and presenting a page with a high possibility to be the break between the documents.

In some cases, a user wants to manage related documents out of scanning target multiple documents as a single file.

However, the methods described in Japanese Patent Laid-Open No. 2001-028041 and No. 2005-208978 are methods of dividing by the document unit. For this reason, one file is generated for each document. Therefore, in order to combine the related multiple documents as a single file, the user needs to combine the files by correcting manually, and this operation is troublesome for the user.

SUMMARY

An information processing apparatus of the present disclosure includes an obtaining unit configured to obtain document group data obtained by scanning a plurality of documents, a dividing unit configured to divide the document group data based on a page as a break between documents and to generate files in document unit, and a combining unit configured to combine a plurality of files that satisfy a predetermined condition out of the generated files into one.

Further features of the present disclosure will become apparent from the following description of exemplary embodiments with reference to the attached drawings.

BRIEF DESCRIPTION OF THE DRAWINGS

FIG. 4 is a diagram illustrating an example of an entity table;

FIG. 9 is a diagram illustrating an example of a named entity;

DESCRIPTION OF THE EMBODIMENTS

Embodiments of a technique of the present disclosure are described below in detail with reference to the appended drawings. A configuration illustrated in the embodiments below is merely an example, and the technique of the present disclosure is not limited to the configuration described in the embodiments below.

Embodiment 1

A variety of types of documents, such as a business form including a bill and a receipt, a contractual document, and a proposal document are handled in a company. Additionally, in each document, a variety of types of information (character strings), such as a title indicating contents of the document, a destination, an issuing source company name, a member name, an issuing date indicating the date of issuing the document, and a price are written. In each company, there has been an increased need to manage a document file obtained by digitalizing the document so as to be easily searched or highly noticeable. For example, there has been performed management to facilitate the grasping of the contents of the file by categorizing by providing the type of the document to a folder name or a file name or by categorizing by providing attribute information of the document, such as a business partner company name and the member name to the folder name or the file name. Additionally, in a case of digitalizing multiple documents, it can be thought to generate the file by the document unit by determining the type of the document from data of multiple pages obtained by scanning a batch of multiple documents by the page unit and dividing into each type of the document.

Figure 1:
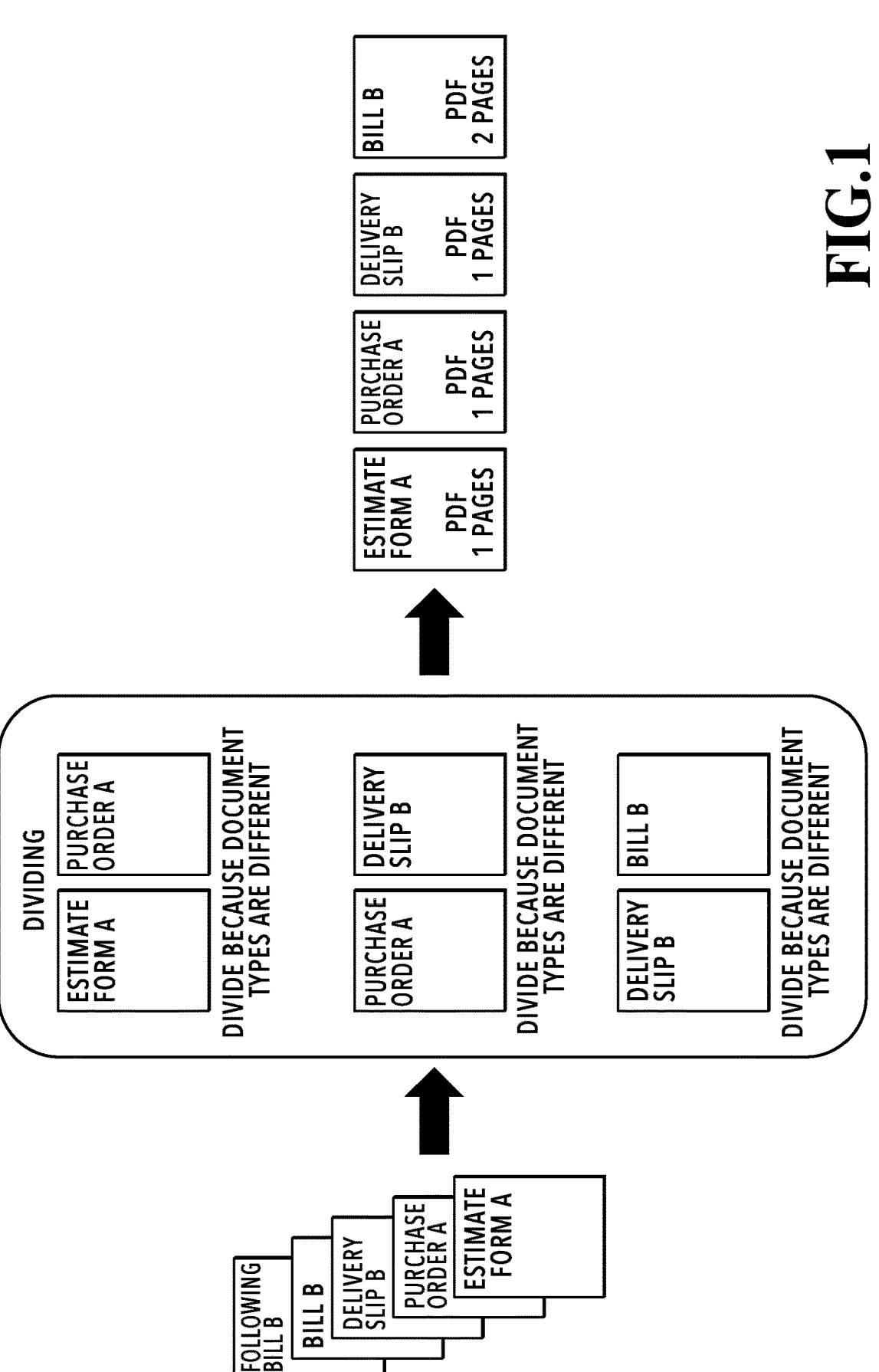
FIG. 1 is a diagram illustrating processing to divide a document file.

FIG. 1 is a diagram illustrating a comparative example of processing to divide data of multiple pages obtained by scanning a batch of multiple documents by the page unit. A left diagram in FIG. 1 illustrates a batch of paper documents of five in total including an estimate form A as one sheet, a purchase order A as one sheet, a delivery slip B as one sheet, and bills B as two sheets. A scanned image group of five pages is generated by scanning the batch of those five paper documents together by a scanner. The scanned image group is then converted to generate document group data of five pages.

It is possible to generate the file in the document unit by comparing adjacent preceding and later pages in the generated document group data of five pages and determining a dividing position as a break between documents.

On the other hand, in some cases, a user wants to manage related documents together. For example, since the estimate form A and the purchase order A are related documents, although they are different documents, the user may want to manage them as a single file. To deal with this, in the present embodiment, a method of not only dividing the document group data but also combining the data, if there is a relation, is described.

[Hardware Configuration]

Figure 2:
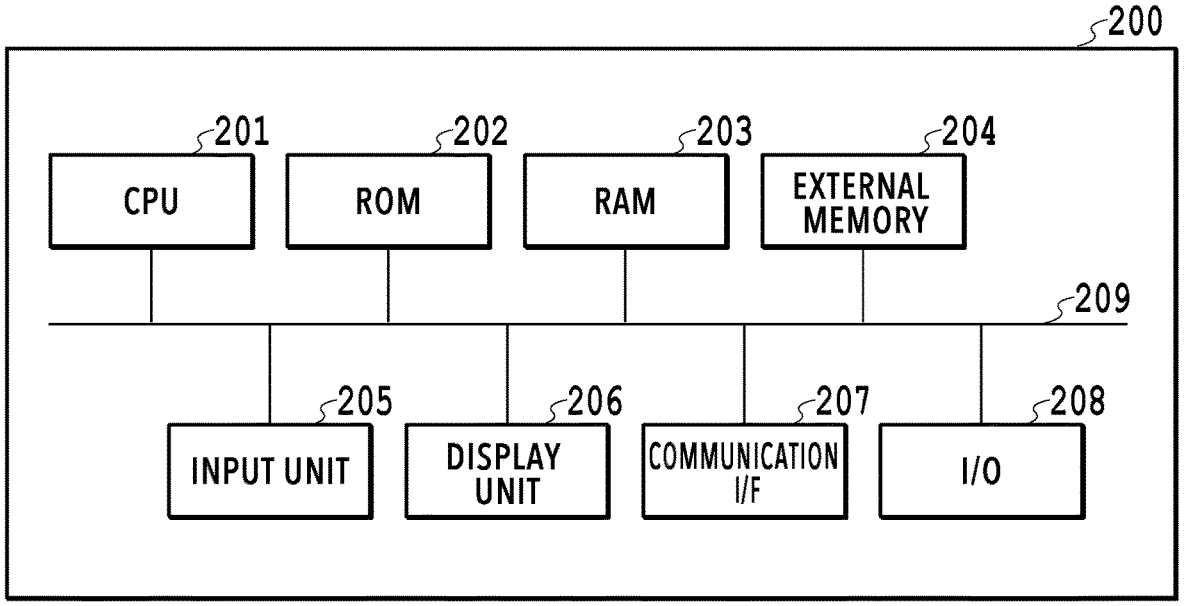
FIG. 2 is a diagram illustrating a hardware configuration of a document group data processing apparatus.

FIG. 2 is a diagram illustrating an example of a hardware configuration of a document group data processing apparatus 200, which is an information processing apparatus of the present embodiment. The document group data processing apparatus 200 includes a CPU 201, a ROM 202, a RAM 203, an external memory 204, an input unit 205, a display unit 206, a communication I/F 207, and an I/O 208.

The CPU 201 controls various devices connected to a system bus 209. The ROM 202 stores a boot program such as a basic input/output system (BIOS) program. The RAM 203 is used as a main storage device for the CPU 201. The external memory 204 stores a program processed by the document group data processing apparatus 200. The input unit 205 is a touch panel, a keyboard, a mouse, a robot controller, or the like, and receives information input and setting by the user. The display unit 206 displays a calculation result from the document group data processing apparatus according to an instruction from the CPU 201. The display unit 206 is a liquid crystal display device, a projector, an LED indicator, or the like, and may be any type. The communication I/F 207 is a communication interface and establishes information communication through a network. The communication interface may be Ethernet (registered trademark) and may be any type such as a USB, serial communication, and wireless communication. The I/O 208 is an input and output unit and is connected with a scanner, and the like. That is, an image (a scanned image) obtained by the scanner scanning a paper document or data generated from the scanned image is received through the I/O 208.

[Functional Configuration]

Figure 3:
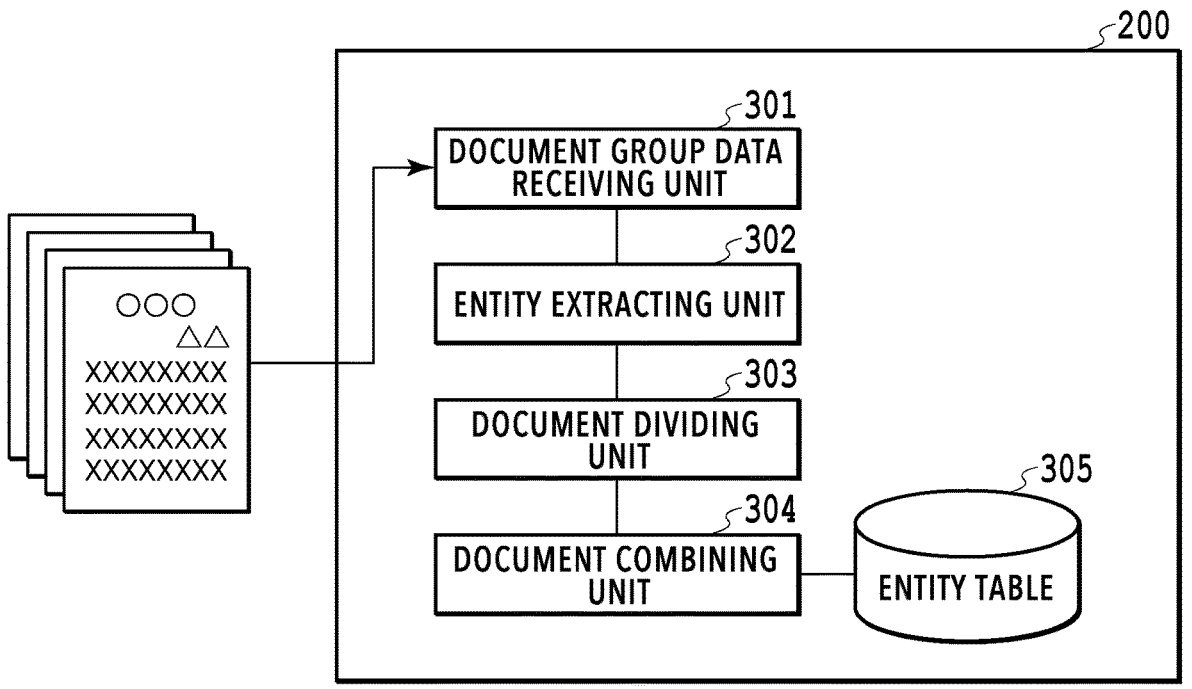
FIG. 3 is a diagram illustrating a functional configuration of the document group data processing apparatus.

FIG. 3 is a diagram illustrating a functional configuration of the document group data processing apparatus 200 according to the present embodiment. The document group data processing apparatus 200 includes a document group data receiving unit 301, an entity extracting unit 302, a document combining unit 304, and a document dividing unit 303.

The document group data receiving unit 301 receives the document group data. The document group data is described as data based on the scanned image (group) in the unit of one page that is obtained by scanning a common document handled in an office, and the like, such as a business form including an estimate form, a delivery slip, a bill, a receipt, and so on, a proposal document, and a contractual document. The format of the document group data may be any format, such as a document file format, including a text file, Word, PDF, and so on, in which a character string is able to be written. Alternatively, the document group data may be image data of multiple pages obtained by scanning the document.

In a case when multiple documents are scanned together, the document group data of multiple pages based on the scanned image group in the page unit of multiple pages is received. Even in a case when only the document of one page is scanned, and data of one page based on the scanned image of one page is received, the received data is called the document group data. The document to be scanned may include multiple pages. For this reason, even in a case of scanning one document, the document group data of multiple pages, based on the scanned image group of multiple pages, may be obtained in some cases.

The entity extracting unit 302 extracts a character string indicating a "named entity" on each page in the document group data from text information corresponding to the page. The "named entity" is, for example, a predetermined item such as a title of the document, a destination of the document, an organization name as the issuing source, a name as the issuing source, a creation date of the document, an issuing date of the document, a document number for managing the document, and a total price. For example, the entity extracting unit 302 extracts the character string indicating the named entity by using a trained model generated by machine learning for outputting the character string indicating the named entity from the text information.

The document group data received by the document group data receiving unit 301 includes the text information in the page unit corresponding to each page. For example, the text information is generated by texting data of the document by using optical character recognition (OCR). Alternatively, the text information may be generated by texting by recognizing a character from the data of the document by using machine learning, and the like. In addition to information on the character string, the text information may include other information such as a font size, a position of a character, a ruled line, and image information.

The document dividing unit 303 recognizes the break between different documents in the received document group data. The document dividing unit 303 then divides the received document group data such that the first page to a page preceding the recognized break is a single document. Additionally, the document dividing unit 303 divides the received document group data such that a page following the recognized break to a page preceding the next recognized break is another document. The received document group data is thus divided, and the file in the document unit is generated.

As a method of recognizing the break between different documents, in a case when the entity extracting unit 302 extracts the character string indicating the title, which is one of the named entities, the break between the documents is recognized between a page from which the character string indicating the title is extracted and a page preceding the page. Thus, the break is recognized based on a difference in the characteristic amount in the character string information or the image information between the preceding and later pages. Alternatively, the break may be recognized by identifying a front cover page registered in advance, or the break may be recognized by using machine learning, and the like.

In a case when a result of the comparison between the pages preceding and following the break recognized by the document dividing unit 303 satisfies a predetermined condition, the document combining unit 304 combines files corresponding to the documents obtained by the dividing by the document dividing unit 303. The document combining unit 304 may cancel the break recognized by the document dividing unit 303 and prevent the dividing. This case is also called "to combine".

Thus, in a case when the files in the unit of multiple documents obtained by the dividing are files of related documents, the document combining unit 304 combines the files obtained by the dividing. For example, two files corresponding to two documents in which common values are used, like a series of documents used for an application form, are combined with each other. In the present embodiment, a method of using an entity table stored in advance in a storage unit 305 in order to determine whether to combine the files divided by the document dividing unit 303 is described.

FIG. 4 is a diagram illustrating an example of an entity table 400. A column 401 in the entity table 400 holds a pair of types of documents that have a possibility to be combined with each other. A column 402 holds the named entity obtained from the page preceding the break recognized by the document dividing unit 303. A column 403 holds the named entity obtained from the page following the break recognized by the document dividing unit 303.

Figure 5:
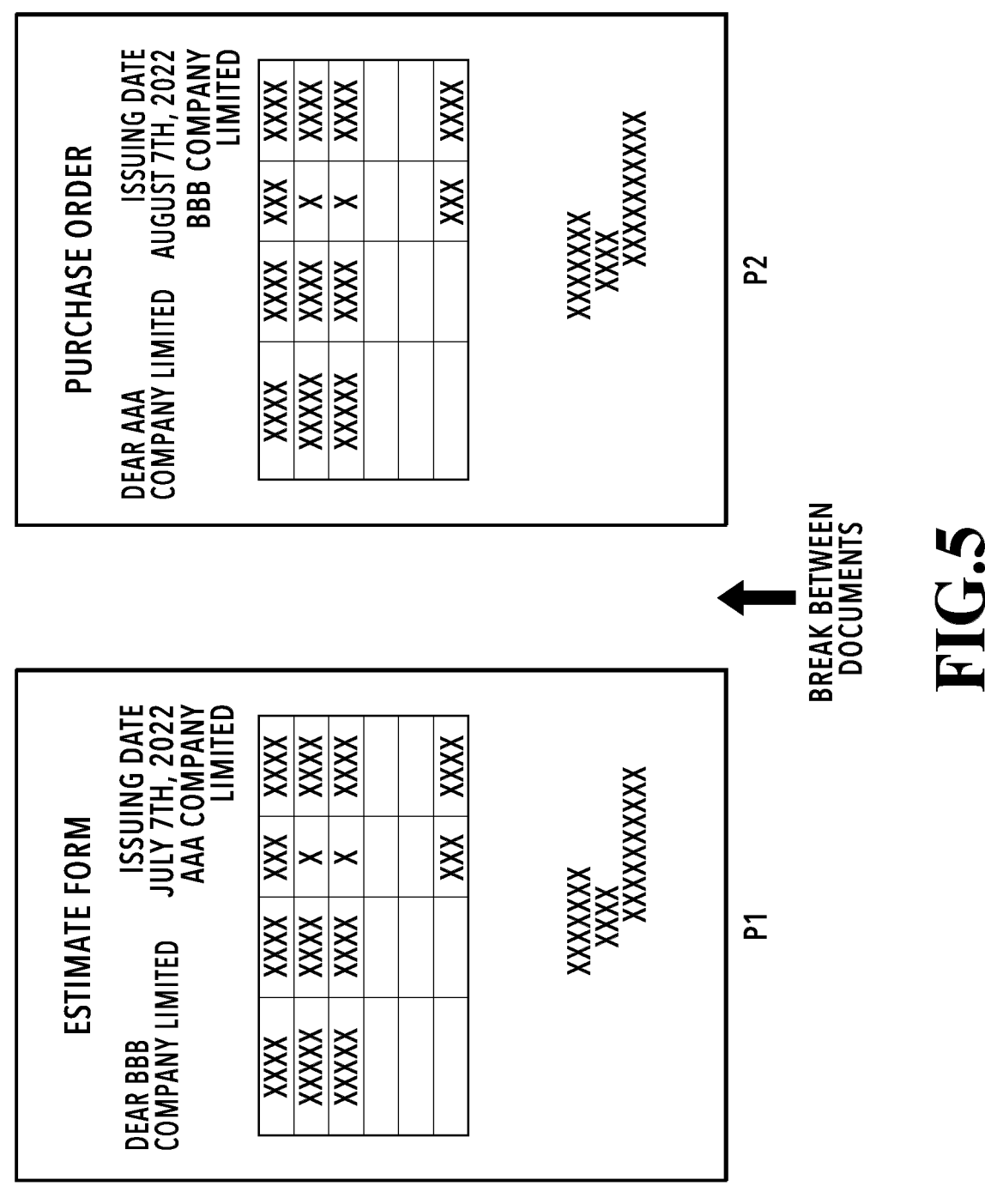
FIG. 5 is a diagram illustrating an example of documents as a combining target.

FIG. 5 is a diagram illustrating determination on the combining using the entity table 400. FIG. 5 illustrates the document group data of two pages, and a boundary between a first page and a second page is recognized as the break between the documents by the document dividing unit 303. In this case, the document combining unit 304 determines whether to combine the recognized break by using the entity table 400.

First, whether a pair of the type of the document of the first page, which is a page preceding the recognized break, and the type of the document of the second page, which is a page following the recognized break, is included in the column 401 in the entity table 400. The column 401 in a row 404 and a row 405 in the entity table 400 in FIG. 4 holds a pair of the estimate form as the preceding page and the purchase order as the later page, and thus the row 404 and the row 405 in the entity table 400 are extracted.

Next, the character string of the named entity held in the column 402 in the extracted row in the entity table 400 is obtained from the text information on the page preceding the recognized break. In FIG. 5, an organization name is written as the destination on the first page that is the page preceding the recognized break, and thus "BBB company limited", which is the character string of "destination organization name" held in the column 402 in the row 404 in the entity table 400, is obtained.

Next, the character string of the named entity held in the column 403 in the row of the pair of the types of the extracted documents in the entity table 400 is obtained from the text information on the page following the recognized break. In FIG. 5, an organization name is written as the issuing source on the second page that is the page following the recognized break, and thus "BBB company limited", which is the character string of "issuing source organization name" held in the column 403 in the row 404 in the entity table 400, is obtained.

In a case when the obtained two character strings are assumed to be the same, that is, in a case when they are similar to each other, the document combining unit 304 determines to combine the break recognized by the document dividing unit 303. That is, in a case of FIG. 5, it is determined that the recognized break are to be combined because obtained two character strings are the same. The determination on whether the obtained two character strings are similar to each other may be performed by, for example, obtaining the similarity, and it is determined to be similar if the similarity is equal to or greater than a threshold.

In a case when the organization name (or the person name) as the destination on the estimate form and the organization name (or the person name) as the issuing source on the purchase order are assumed to be the same as illustrated in FIG. 5, the relationship between the estimate form and the purchase order is the relationship of round-trip documents. Therefore, the estimate form and the purchase order are combined with each other since they are thought to be related documents. In addition, for example, in a case of a delivery slip and a bill issued in a series of purchase processing, the organization name (or the person name) as the destination on the delivery slip and the organization name (or the person name) as the destination on the bill are thought to be the same. Thus, the document combining unit 304 can determine whether to perform the combining by using the entity table 400 by holding in the entity table 400 the named entities that are thought to coincide with each other in a case of related documents.

Thus, the document combining unit 304 compares the character strings indicating the specific named entities in accordance with the pair of the types of the documents of the pages preceding and following the break recognized by the document dividing unit 303. Then, it is determined to perform the combining if the similarity between the character strings indicating the named entities as the comparing target is equal to or greater than the threshold. Note that, the character strings indicating the named entities as the target may be obtained from all the pages in the same document including the page preceding the recognized break. Likewise, the character strings indicating the named entities as the target may be obtained from all the pages in the same document including the page following the recognized break.

Note that, in addition to the method of using the entity table 400, the document combining unit 304 may determine whether to combine the documents by using the trained model generated by performing machine learning.

[Flowchart]

Figure 6:
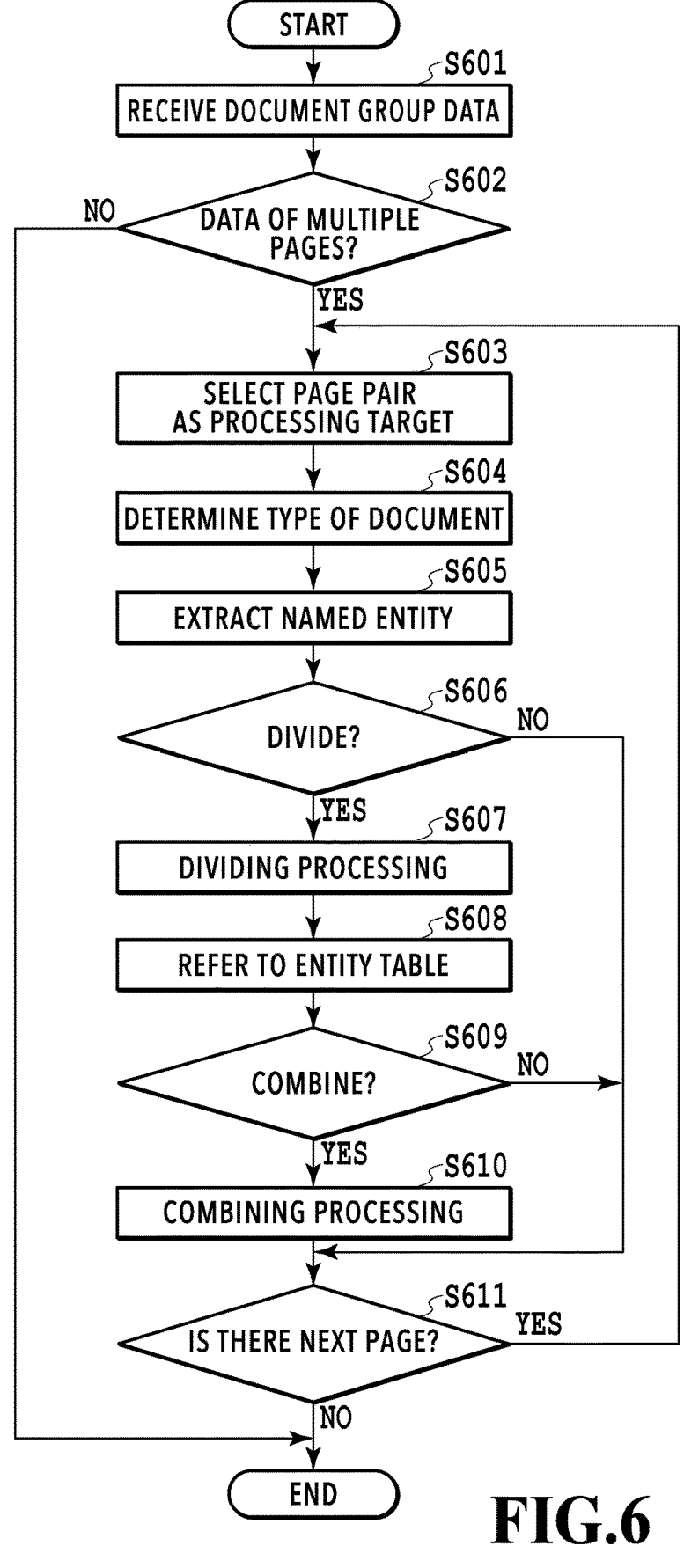
FIG. 6 is a flowchart illustrating document dividing and document combining processing.

FIG. 6 is a flowchart illustrating a flow of the processing by the document group data processing apparatus 200 of the present embodiment. A series of the processing illustrated in the flowchart in FIG. 6 is performed with the CPU of the document group data processing apparatus 200 deploying and executing a program code stored in the ROM into the RAM. Additionally, a part of or all the functions of a step in FIG. 6 may be implemented by hardware such as an ASIC and an electronic circuit. Note that, a sign "S" in each description of the processing means that it is a step in the flowchart, and the same applies to the following flowcharts.

In S601, the document group data receiving unit 301 obtains the document group data received by the document group data processing apparatus 200. As described above, the scanned image obtained by scanning the document or the data generated from the scanned image is received as the document group data. The document group data is described as document group data including one page or multiple pages.

In S602, the entity extracting unit 302 determines whether the document group data obtained in S601 is the document group data including multiple pages. If the document group data obtained in S601 is the document group data including one page (NO in S602), the dividing cannot be performed, and thus the present flowchart ends. If it is determined to be the document group data including multiple pages, (YES in S602), the process proceeds to S603. For example, in a case when the document group data based on the scanned image group obtained by scanning multiple documents together by the page unit is obtained, the obtained document group data is the document group data including multiple pages, and, therefore, it is determined to be YES in S602.

In S603, the entity extracting unit 302 selects a page in the order from the first page of the document group data obtained in S601 and selects the selected page and the next page of the selected page as a page pair as the processing target.

In S604, the entity extracting unit 302 determines the type of the document of the later page out of the page pair as the processing target. In a case when the page pair as the processing target includes the first page, the type of the document of the first page is also determined.

A method of determining the type of the document is, for example, searching for a specific word identifying the type of the document from the text information on the target page, and determining the type of the document corresponding to the specific word obtained as a result of the searching as the type of the document of the page as the processing target. The specific word in a case of the estimate form is, for example, a character string such as "estimate form", "esti-mate", "cost estimate", and "Quotation". In addition, the type of the document may be determined by using the trained model obtained by machine learning with the text information on the target page being used as input data and the type of the document being used as output data and teaching data.

In S605, the entity extracting unit 302 extracts the char-acter string indicating the named entity from the text infor-mation on each page of the page pair as the processing target. Note that, in a case when the page pair as the processing target is a pair of the second page and a third page or the following pair, the character string indicating the named entity on the preceding page out of the page pair as the processing target is already extracted. For this reason, it is only necessary to extract the character string indicating the named entity from the later page out of the page pair as the processing target. Thus, the character strings indicating the named entities of two pages of the page pair as the processing target are prepared.

In S606, the document dividing unit 303 determines whether the page pair as the processing target is the pages as the break between different documents. If it is not deter-mined as the break between different documents (NO in S606), the dividing is not performed, and thus the process proceeds to S611. On the other hand, if it is determined as the break between different documents (YES in S606), the process proceeds to S607.

In S607, the document dividing unit 303 performs the processing to divide the document group data, including multiple pages, by using a boundary in the page pair as the processing target as the break. For example, in a case when no break is recognized in advance, the document group data is divided such that the first page to the preceding page out of the page pair as the processing target are a single file. In a case when another break is determined in advance, the document group data is divided such that a page following the other break to the preceding page out of the page pair as the processing target are a single file. In order to manage the break between the documents, in the present embodiment, an ID that can be identified as a document break is provided to the last page of the document, which is the page preceding the recognized break. Alternatively, the ID may be applied to the top page of the document, which is the page following the break.

In S608, the document combining unit 304 searches for the pair of the types of the documents regarding the page pair as the processing target from the column 401 in the entity table 400 in FIG. 4. The pair of the types of the documents regarding the page pair are the type of the document of the preceding page out of the page pair as the processing target and the type of the document of the later page out of the page pair as the processing target. The document combining unit 304 then extracts the row holding the searched pair of the types of the documents in the entity table 400 in FIG. 4.

The document combining unit 304 then obtains the cor-responding character string from the character string extracted in S605. Specifically, the document combining unit 304 obtains the character string of the named entity held in the column 402 in the extracted row in the entity table 400 from the character string extracted from the preceding page out of the page pair as the processing target. In a case when the preceding page out of the page pair as the processing target is the last page of the document of multiple pages, the character string of the selected named entity may be obtained from the character string extracted from each page from the first page of the document to the preceding page out of the page pair as the processing target.

Additionally, the document combining unit 304 obtains the character string of the named entity held in the column 403 in the extracted row in the entity table 400 from the character string extracted from the later page out of the page pair as the processing target. In a case when the later page out of the page pair as the processing target is the first page of the document of multiple pages, the character string of the selected named entity may be obtained from the character string extracted from each page from the later page out of the page pair as the processing target to the last page of the document.

In S609, the document combining unit 304 determines whether the character strings indicating the named entities respectively obtained from the page pair as the processing target are the same or similar to each other enough to be assumed as the same. That is, the document combining unit 304 determines whether to combine the page pair as the processing target. If it is determined that the pages are not combined (NO in S609), the combining is not performed, and thus the process proceeds to S611. On the other hand, if it is determined that the pages are combined (YES in S609), the process proceeds to S610.

Note that, the entity table 400 is a table generated by organizing the named entities having a strong relationship with the pair of the types of the documents between docu-ments. However, there are not necessarily held the named entities corresponding to the pair of all the types of the documents. In a case when there is no type of the document corresponding to the entity table 400, or in a case when no named entity can be identified, it is determined that it is not the target of the combining, and the process proceeds to S611.

In S610, the document combining unit 304 performs the processing to combine the page pair as the processing target. The document combining unit 304 provides again the ID identifying the document break, which is provided by the document dividing unit 303 in S607, to the last page of the document data obtained by the combining processing.

In S611, the entity extracting unit 302 determines whether the document group data obtained in S601 includes the next page of the later page out of the page pair as the processing target selected this time. If the later page out of the page pair as the processing target selected in S603 is the last page of the document group data (NO in S611), the present flowchart ends. If there is the next page (YES in S611), the processing returns to S603, the new page pair as the processing target is selected, and the steps in and after S604 are repeated.

In the flowchart in FIG. 6, the steps for performing the combining processing in S608 to S610 are described to be performed after the dividing processing in S607. In addition, the combining processing may be executed after the determination on whether to divide is performed on all the page pairs and the dividing is executed on the document group data. In this case, out of the files corresponding to the documents obtained by the dividing, two files in which the last page of one file and the first page of the other file are adjacent pages in the document group data obtained in S601 are selected. Then, processing similar to S608 to S610 may be performed on the selected files as the processing target. In a case when the file as the processing target is a file of the document of multiple pages, in S610, the character string of the named entity in the entity table 400 may be obtained from the character strings extracted from all the pages of the file as the processing target.

Figure 7:
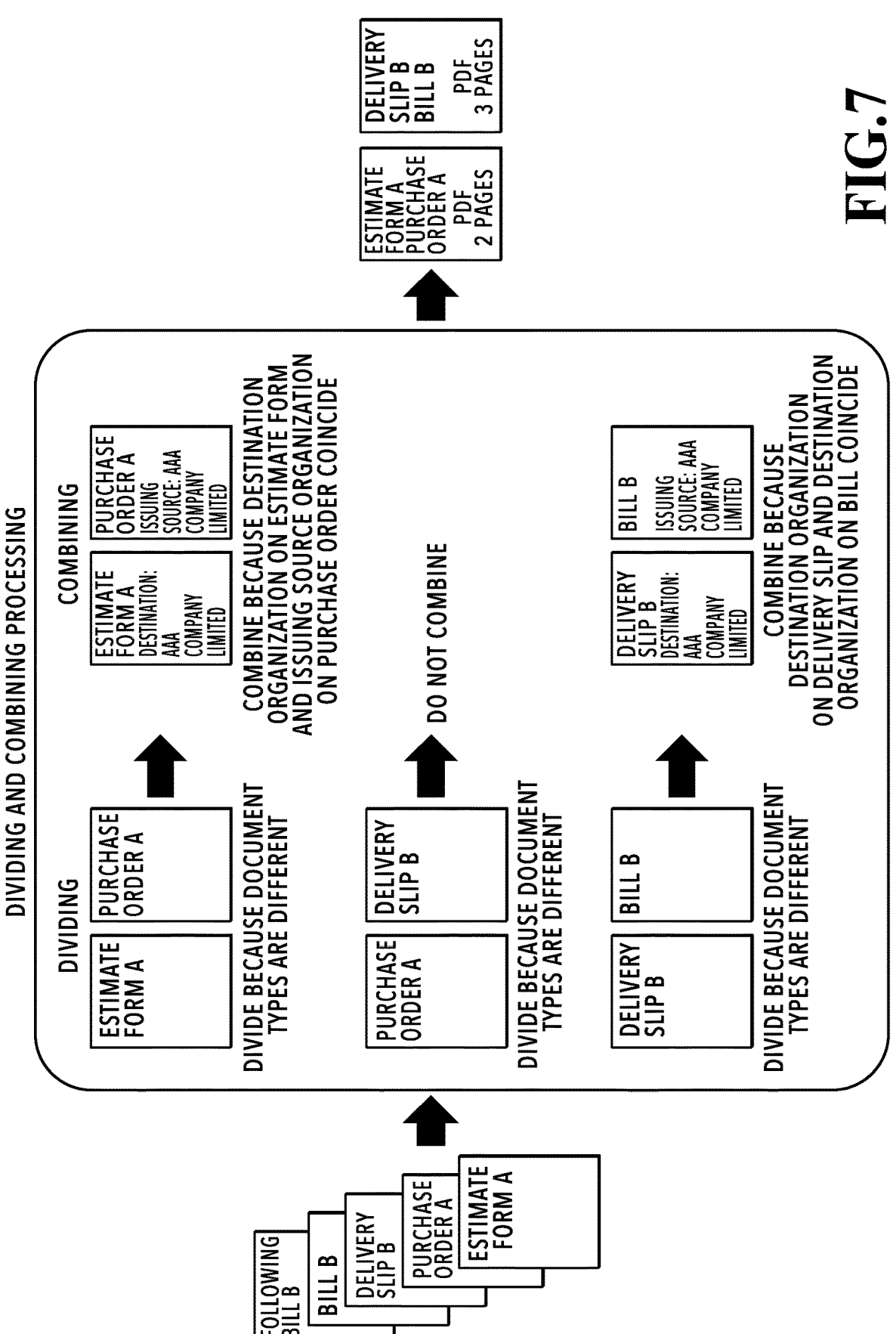
FIG. 7 is a diagram illustrating the document dividing and the document combining processing.

FIG. 7 is a diagram describing the dividing and combining processing of the present embodiment. A left diagram in FIG. 7 illustrates a batch of paper document of five in total including the estimate form A as one sheet, the purchase order A as one sheet, the delivery slip B as one sheet, and the bills B as two sheets. The purchase order A is a document issued based on the estimate form A, and the user wants to manage electronic data of the estimate form A and the purchase order A as a single file. Additionally, the bills B are documents issued based on the delivery slip B, and the user wants to manage electronic data of the bills B and the delivery slip B as a single file.

The document group data of five pages is generated by scanning the batch of those five paper documents. The document dividing unit 303 then compares adjacent pages as a pair in the document group data to determine the break between the documents and to divide the document group data.

Additionally, in the present embodiment, in a case when predetermined character strings coincide with each other in the files in the document unit obtained by the dividing, the processing to combine the files obtained by the dividing is executed. Therefore, although the file is generated such that the estimate form A and the purchase order A are separated from each other in the method of the comparative example in FIG. 1, in the present embodiment, the estimate form A and the purchase order A are combined as a single file. Additionally, although the file is generated such that the delivery slip B and the bills B are separated from each other in the method of the comparative example in FIG. 1, in the present embodiment, the delivery slip B and the bills B are combined as a single file.

As described above, according to the present embodiment, it is possible to digitalize the document group including pages of multiple documents so as to be combined into pages of related multiple documents.

Embodiment 2

In the present embodiment, a method of generating a file name of the file generated by the dividing and combining processing performed by the document group data processing apparatus 200 is described. A difference from the Embodiment 1 is mainly described to describe the present embodiment. The same configuration and processing as that of the Embodiment 1 are applied unless otherwise stated.

Figure 8:
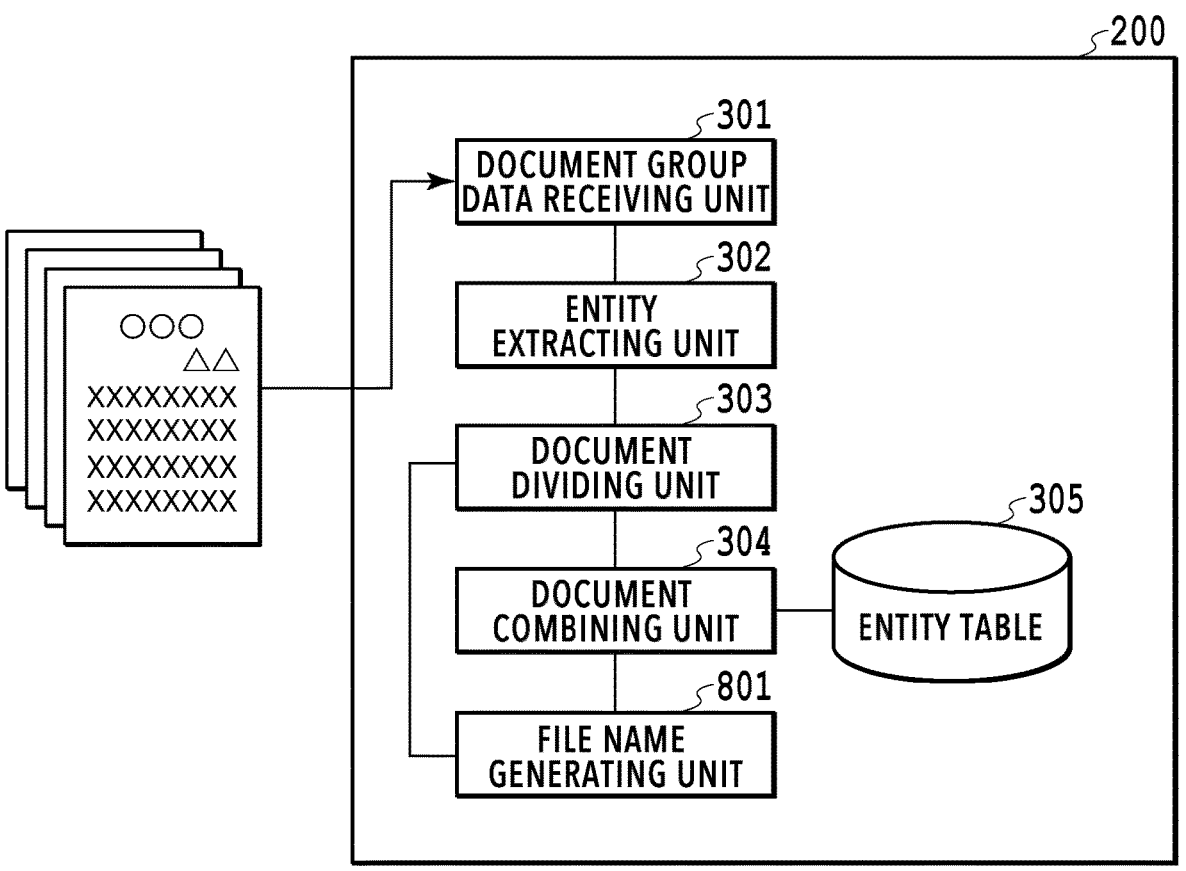
FIG. 8 is a diagram illustrating a functional configuration of the document group data processing apparatus.

FIG. 8 is a block diagram illustrating a function of the document group data processing apparatus 200 of the present embodiment. The same configuration as that of the Embodiment 1 is denoted by the same reference numeral, and the description is omitted. The document group data processing apparatus 200 includes a file name generating unit 801 in addition to the functional unit described in the Embodiment 1.

The file name generating unit 801 generates the file name to be provided to the file generated as a result of performing the processing by the document dividing unit 303 and the document combining unit 304. For example, the file name generating unit 801 generates the file name by using the character string indicating the type of the document.

FIG. 9 is a table holding two named entities that are assumed to be appropriate, other than the type or the title of the document for the file name corresponding to the type of the document. The file name generating unit 801 may extract the character string indicating the named entity corresponding to the table in FIG. 9 and use the extracted character string for the file name.

The table in FIG. 9 holds a first priority named entity and a second priority named entity as the character string used for the file name. In principle, the character string indicating the first priority named entity is used for the file name. An example of using the character string indicating the second priority named entity for the file name includes a case when the character string indicating the first priority named entity cannot be extracted. Additionally, for example, there may be a case when it is selected based on setting by the user to use the character string indicating the second priority named entity for the file name. For example, although the first priority named entity of the purchase order is "issuing source organization name", in a case when the user belongs to the ordering organization, using the character string indicating "total price" as the second priority named entity for the file name is prioritized.

Note that, the association between the type of the document and the named entity used for the file name in FIG. 9 is an example, and the contents held in FIG. 9 may be changed by the user. A method of generating the file name may be generated by making an inference based on machine learning.

Figure 10:
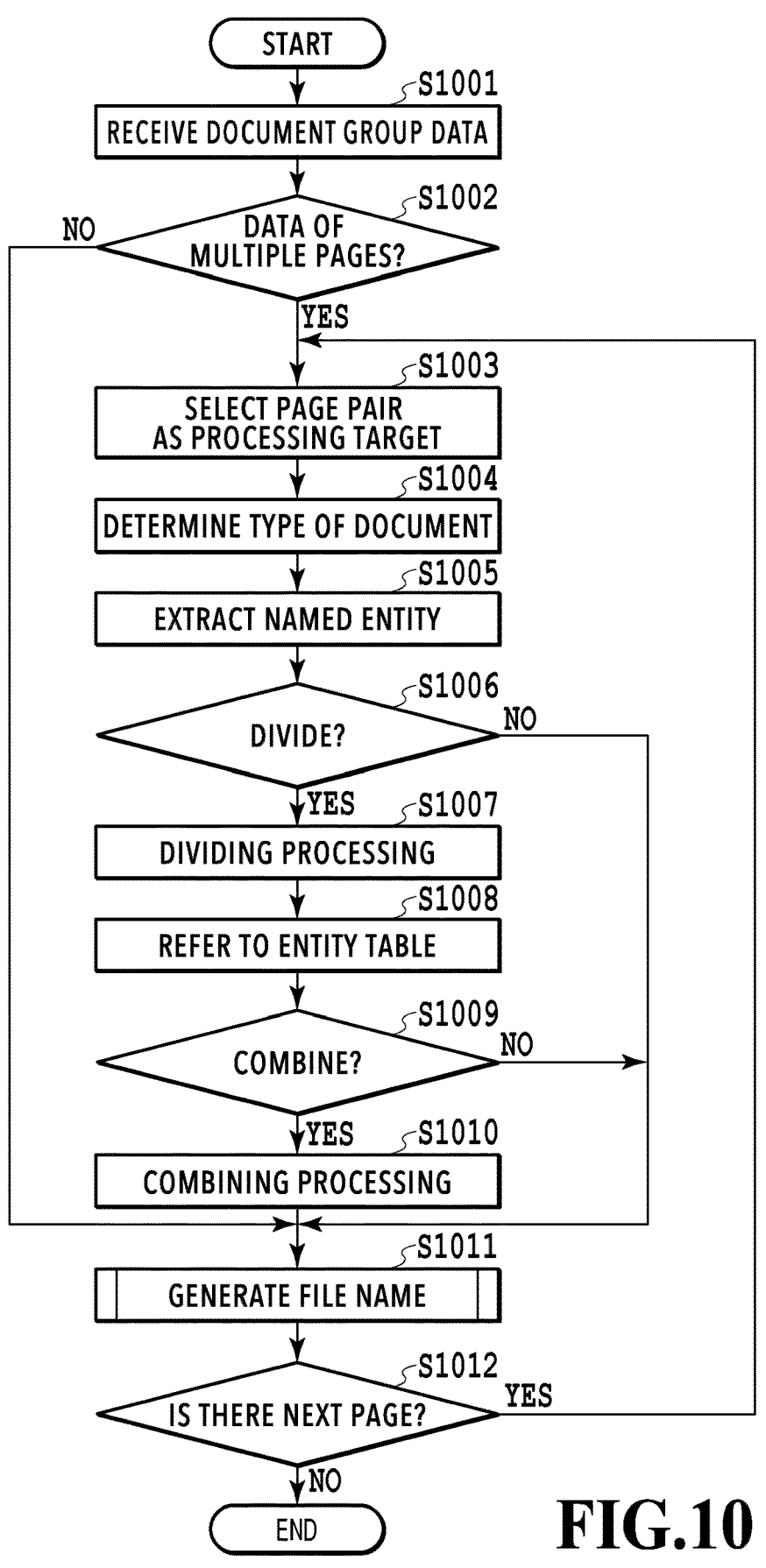
FIG. 10 is a flowchart illustrating document dividing and document combining processing.

FIG. 10 is a flowchart illustrating a flow of the processing by the document group data processing apparatus 200 of the present embodiment.

S1001 to S1010 are the same as S601 to S610. For this reason, the descriptions are omitted. In the present embodiment, if it is determined that the dividing is not performed (NO in S1006), if it is determined that the combining processing is not performed after the dividing processing (NO in S1009), or after the combining processing in S1010 is performed, the process transitions to S1011.

In S1011, the processing of generating the file name by using the character string indicating the type of the document of the page pair as the processing target.

Figure 11:
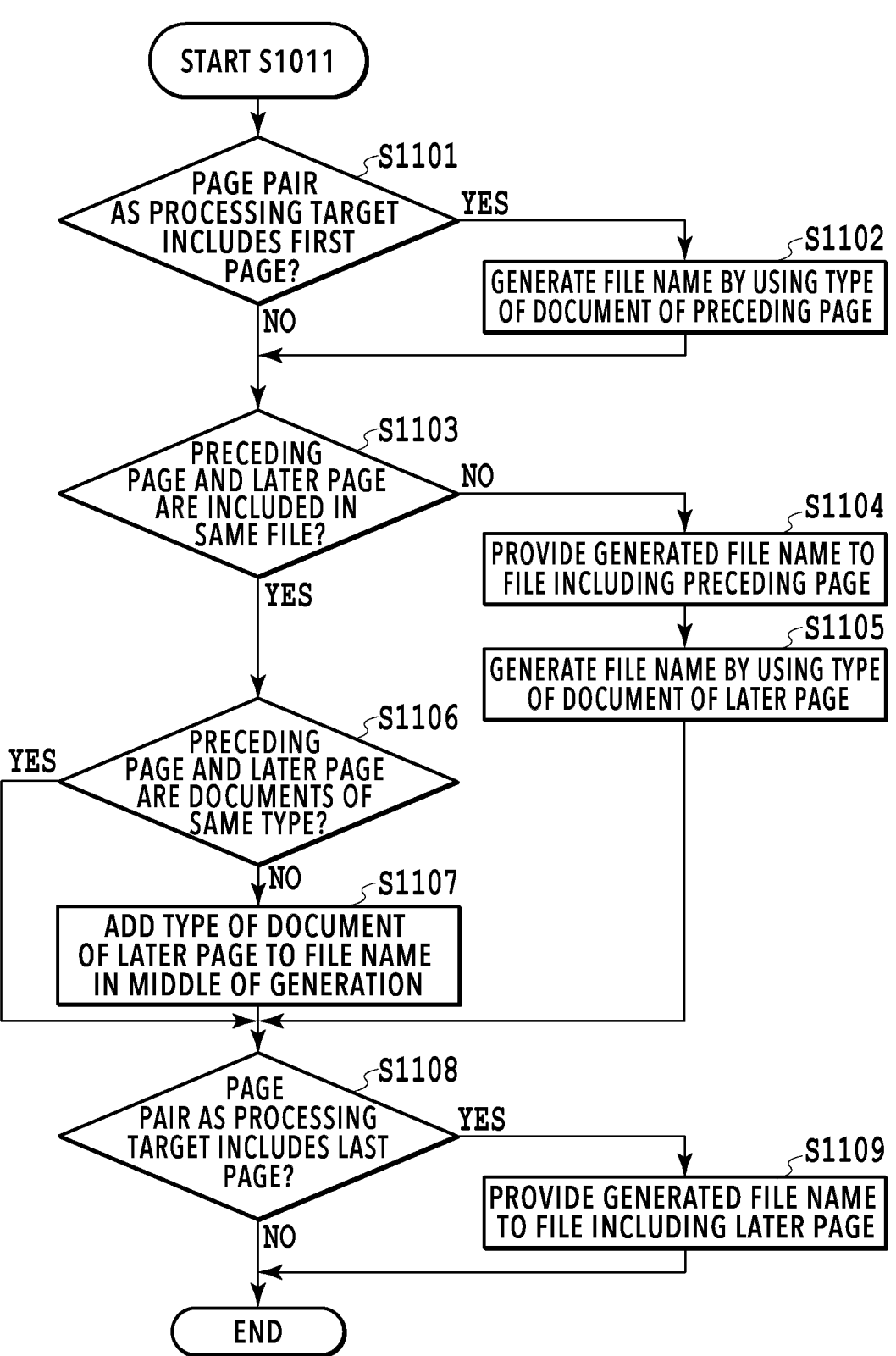
FIG. 11 is a flowchart illustrating file name generating processing.

FIG. 11 is a flowchart illustrating details of S1011.

In S1101, the file name generating unit 801 determines whether the page pair as the processing target includes the first page of the document group data obtained in S1001. If the first page is included (YES in S1101), the process proceeds to S1102.

In S1102, the file name generating unit 801 generates the file name by using the character string indicating the type of the document of the first page that is determined in S1004. For example, in a case when the type of the document in the first page is determined as "estimate form" in S1004, the generated file name is "estimate form.pdf". Note that, the generated file name is not provided to the file because there is a possibility that the character string indicating the type of the document is further added.

On the other hand, if the page pair as the processing target does not include the first page (NO in S1101), the process skips S1102 and proceeds to S1103. In S1103, the file name generating unit 801 determines whether the page pair as the processing target is pages in the same file as a result of the processing from S1004 to S1010.

For example, if it is determined in S1006 that the dividing is performed since the preceding page out of the page pair as the processing target is the last page of the estimate form while the later page thereof is the first page of the purchase order, and also if it is determined in S1009 that the preceding page and the later page are not combined, it is determined as NO in S1103. If it is determined as NO in S1103, the process proceeds to S1104.

In S1104, the file name generating unit 801 provides the generated file name as the file name to the file including the preceding page out of the page pair as the processing target. For example, in a case when "estimate form.pdf" was the generated file name, the generated file name "estimate form.pdf" is provided to the file including the preceding page out of the page pair as the processing target. In a case when the generated file name was provided to the file, a new file name is generated in the next file name generation. The process then proceeds to S1105.

In S1105, the file name generating unit 801 generates a new file name by using the character string indicating the type of the document of the later page out of the page pair as the processing target that is determined in S1004. For example, in a case where the type of the document of the later page out of the page pair as the processing target is determined as "purchase order", the generated file name is "purchase order.pdf". The process then transitions to S1108. Note that, the generated file name is not provided to the file because there is a possibility that the character string indicating the type of the document is further added.

On the other hand, for example, if it is determined in S1006 that the dividing is not performed since the preceding page out of the page pair as the processing target is the estimate form while the later page thereof is the same estimate form, it is determined as YES in S1103. Alternatively, if it is determined in S1009 that the preceding page and the later page are combined although the preceding page is the last page of the estimate form while the later page is the first page of the purchase order, it is determined as YES in S1103. If it is determined as YES in S1103, the process proceeds to S1106.

In S1106, the file name generating unit 801 determines whether the type of the document of the preceding page out of the page pair as the processing target and the type of the document of the later page thereof are the same.

For example, if the preceding page out of the page pair as the processing target is the estimate form and the later page thereof is the same estimate form, it is determined as YES in S1106. If it is determined as YES in S1106, the process skips the later-described S1107 and transitions to S1108.

On the other hand, for example, if it is determined in S1009 that the preceding page and the later page are combined although the preceding page out of the page pair as the processing target is the last page of the estimate form, while the later page thereof is the first page of the purchase order, and thus it is determined in S1006 that the dividing is performed, it is determined as NO in S1106. If it is determined as NO in S1106, the process proceeds to S1107.

In S1107, the file name generating unit 801 adds the character string indicating the type of the document of the later page out of the page pair as the processing target to the generated file name not provided to the file. For example, in a case when the generated file name currently is "estimate form.pdf", and the type of the document of the later page out of the page pair as the processing target is "purchase order", the file name generating unit 801 generates the generated file name as "estimate form_purchase order.pdf".

In S1108, the file name generating unit 801 determines whether the page pair as the processing target includes the last page of the document group data obtained in S1001. If the last page is included (YES in S1108), the process proceeds to S1109.

In S1109, the file name generating unit 801 provides the generated file name as the file name to the file including the later page out of the page pair as the processing target. For example, in a case when "estimate form_purchase order.pdf" is currently the generated file name, the generated file name "estimate form_purchase order.pdf" is provided to the file including the later page out of the page pair as the processing target. If S1109 ends, or if the last page is not included (NO in S1108), the flowchart in FIG. 11 for the page pair as the processing target ends.

Note that, the file name generating unit 801 may generate the file name by further adding the character string indicating the named entity in the table in FIG. 9 with reference to the table in FIG. 9. For example, in a case when the type of the document of the preceding page out of the page pair as the processing target is determined as the estimate form, the file name generating unit 801 obtains the character string indicating the product name, which is the first priority named entity in a row 901 in the table in FIG. 9, from the preceding page. As a result, "laptop computer" is obtained as the character string indicating the product name. Additionally, in a case when the type of the document of the later page out of the page pair as the processing target is determined as the purchase order, the file name generating unit 801 obtains the character string indicating the issuing source organization name, which is the first priority named entity in a row 902 in the table in FIG. 9, from the later page. As a result, "company A" is obtained as the character string indicating the issuing source organization name. In this case, the file name generating unit 801 may generate the file name as "laptop computer estimate form_company A purchase order.pdf" or "estimate form_purchase order laptop computer_company A.pdf".

Note that, in a case when the corresponding document has multiple pages, the named entity to be added as the file name may be extracted from all the pages of the corresponding document.

Embodiment 3

In the present embodiment, a method of managing information on the file generated as a result of the dividing and combining processing is described. A difference from the Embodiment 1 is mainly described to describe the present embodiment. The same configuration and processing as that of the Embodiment 1 are applied unless otherwise stated.

Figure 12:
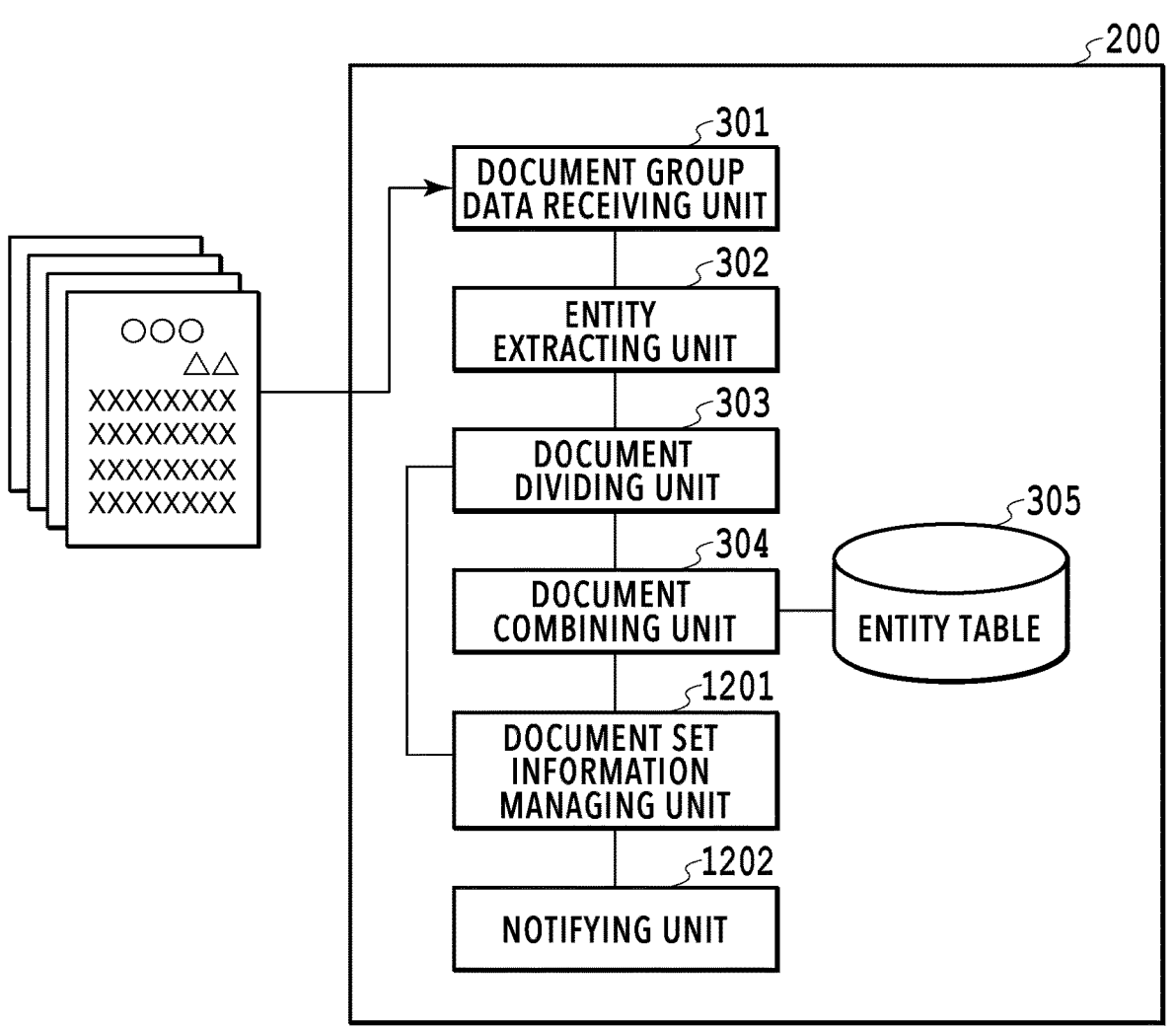
FIG. 12 is a diagram illustrating a functional configuration of the document group data processing apparatus.

FIG. 12 is a functional block diagram of the document group data processing apparatus 200 of the present embodiment. The same configuration as that of Embodiment 1 is denoted by the same reference numerals, and the description is omitted. The document group data processing apparatus 200 includes a document set information managing unit 1201 and a notifying unit 1202, in addition to the functional unit described in Embodiment 1.

The document set information managing unit 1201 manages document set information that is information on a document set. The "document set" is a file generated by combining multiple documents like a file generated by combining a file of the estimate form and a file of the purchase order. In the "document set information", for example, the types of the documents included in the document set is associated with a title that is a value for identifying the document set (the character string). Additionally, in order to discriminate from another document set and identify as the document set, the document set information managing unit 1201 associates a document set ID with the title and the types of the included documents, and thus manages as the document set information. The notifying unit 1202 makes an alert notification to the user.

Figure 13:
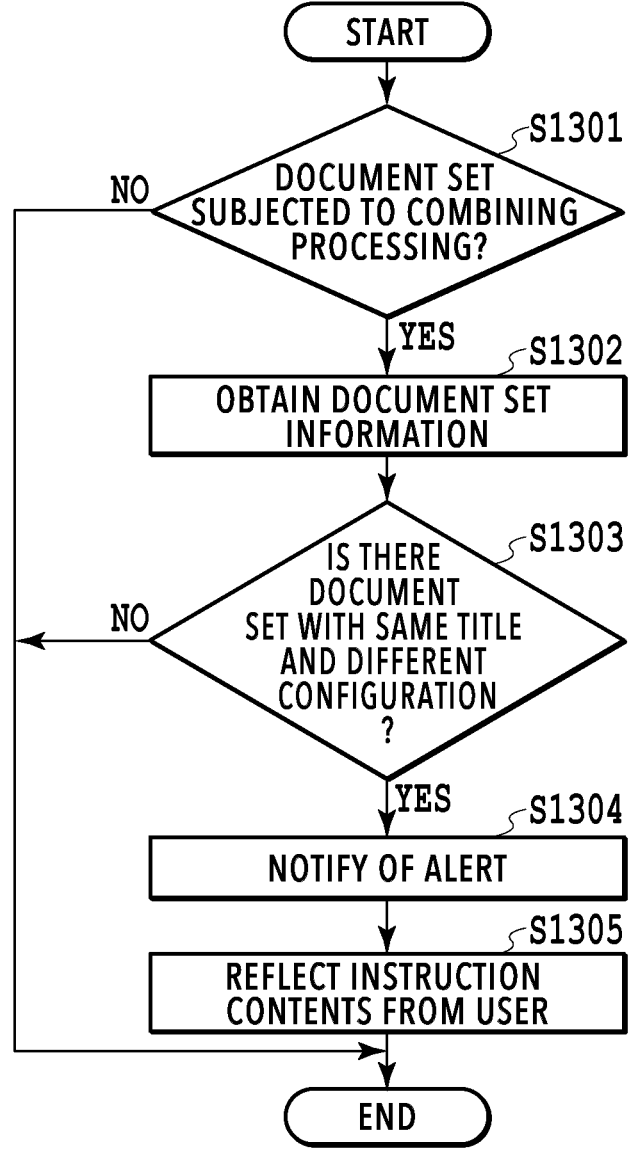
FIG. 13 is a flowchart describing alert processing for a document set.

FIG. 13 is a flowchart describing a flow of the processing to manage the document set information by the document group data processing apparatus 200 of the present embodiment. The processing in FIG. 13 is started from a state in which the dividing processing or the combining processing of the document group data ends, at least one or more document sets are generated, and the document set information is stored.

In S1301, the notifying unit 1202 determines whether the document set as the processing target is a document set generated as a result of performing the combining processing. If the combining processing is not performed (NO in S1301), it is unnecessary to confirm the contents of the document set as the processing target in the later-described step, and, thus, the flowchart in FIG. 13 ends. On the other hand, if it is determined that the combining processing is performed (YES in S1301), the process proceeds to S1302.

In S1302, the notifying unit 1202 obtains the stored document set information. That is, the pair of a title of a document set and types of documents included in a document set, which is associated with each document set ID, is obtained.

In S1303, the notifying unit 1202 compares the stored document set information with the document set as the processing target. Then, it is determined whether the configuration of types of documents of the document set as the processing target and the types of the documents in the stored document set information associated with the same title of the document set as the processing target are different from each other.

Here is applied an operation to generate the document set such that the documents of the same types are included in the document set if the title of the document set is the same. For example, in the document set information, there is the information that the types of the documents included in the document set that is associated with the title "withdrawal request" is the estimate form, the purchase order, the delivery slip, and the bill. In this case, the document set with the title "withdrawal request" is thought to be a type of a business form set regarding the request of withdrawal. Therefore, if the types of the documents included in the document set with the title of "withdrawal request" as the processing target are not the estimate form, the purchase order, the delivery slip, and the bill, it can be thought that there is a lack of the required document in the document set as the processing target. Otherwise, it can be thought that an unnecessary document is included.

If there is a difference between the types of the documents of the document set as the processing target and the types of the documents in the stored document set information (YES in S1303), the process proceeds to S1304. In S1304, the notifying unit 1202 makes an alert notification to the user to confirm the contents of the document set. A method of the notification may be a method such as, for example, displaying on an application program, or transmitting an email prompting the confirmation to a registered email address. In a case when a text is included in the alert notification, the user can easily confirm and make a correction by including a correction option, past correction history, and the like, in addition to the title and the types of the included documents of the document set as the processing target. Once receiving confirmation or a correction instruction from the user, the process proceeds to S1305.

In S1305, based on the contents of the instruction from the user, the document set information managing unit 1201 corrects the title or the configuration of the types of the documents that is associated with the corresponding document set ID and stored as the document set information. Alternatively, the document set information managing unit 1201 corrects the title of the document set as the processing target. Otherwise, the title of the document set as the processing target is corrected, and a pair of the title and the types of the included documents of the document set as the processing target is stored as new document set information in association with a new document set ID. Once S1305 ends, the correction of the document set information by the document set information managing unit 1201 is completed, and thus the flowchart in FIG. 13 ends.

According to the technique of the present disclosure, it is possible to combine related documents into a single file from data obtained by scanning multiple documents together.

OTHER EMBODIMENTS

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
one or more memories storing instructions; and
one or more processors executing the instructions:
(1) to obtain scanned images consisting of multiple pages by scanning a plurality of different documents collectively;
(2) to determine a break between the different documents in the scanned images;
(3) in a case when a first document indicated by the page preceding the break and a second document indicated by the page following the break in the scanned images do not satisfy a predetermined condition indicating related documents, to divide the scanned images at the break to generate files so that the first document and the second document are separated;
(4) in a case when the first document and the second document, that is not the same document as the first document, satisfy the predetermined condition, to combine the first document indicated by the page preceding the break and the second document indicated by the page following the break; and
(5) generate a filename for each of one or more files generated from the scanned images by using at least a character string indicating a type of a document corresponding to the file,
wherein, based on a result of comparing a character string indicating a first item included in the first document with a character string indicating a second item included in the second document, the one or more processors further execute the instructions to determine whether the predetermined condition is satisfied,
wherein the first item is a named entity included in the first document, and wherein the second item is a named entity included in the second document, and
wherein the comparing is carried out using a trained model.

2. The information processing apparatus according to claim 1, wherein the one or more processors further execute the instructions to extract a character string indicating a predetermined item from each page in the scanned images, and
wherein, in the comparing, the extracted character string indicating the first item on a page corresponding to the first document is compared with the extracted character string indicating the second item on a page corresponding to the second document.

3. The information processing apparatus according to claim 1, wherein the first item and the second item are determined in accordance with a pair of a type of the first document and a type of the second document.

4. The information processing apparatus according to claim 1, wherein, in a case when the character string indicating the first item and the character string indicating the second item are different from each other, the scanned images are divided at the break to generate files so that the first document and the second document are separated, and
wherein in a case when the character string indicating the first item and the character string indicating the second item are the same, the first document and the second document are combined to generate a file so that the first document and the second document are included in one file.

5. The information processing apparatus according to claim 1, wherein the one or more processors further execute the instructions:
to generate files by dividing the scanned images at the break; and
to combine two files, in a case when the two files, in which a last page of one file of the two files and a first page of the other file of the two files, satisfy the predetermined condition, the last page and the first page being adjacent pages in the scanned images.

6. The information processing apparatus according to claim 1, wherein the scanned images are images in a PDF format obtained by scanning the plurality of documents by a page unit.

7. The information processing apparatus according to claim 1, wherein the one or more processors further execute the instructions to determine whether or not an interval between two adjacent pages selected from the scanned images is the break.

8. The information processing apparatus according to claim 1, wherein the filename is generated by further using a predetermined character string included in a page of the generated file.

9. The information processing apparatus according to claim 1, wherein the one or more processors further execute the instructions to manage a value for identifying the file generated so that two or more documents are included in one file and a configuration of types of the two or more documents in association with each other.

10. The information processing apparatus according to claim 9, wherein the one or more processors further execute the instructions:
to obtain the configuration of the types of the two or more documents associated with the same value as the value for identifying a file as a processing target from the managed data; and
to notify a user in a case when the obtained configuration of the types of the two or more documents and a configuration of types of documents of the file as the processing target are different from each other.

11. The information processing apparatus according to claim 1, wherein the predetermined condition includes one or more of the following conditions:
(1) a condition that the first document is an estimate form and the second document is a purchase order,
(2) a condition that the first document is a delivery slip and the second document is a bill,
(3) a condition that the first document is a bill and the second document is a receipt, and
(4) a condition that the first document is an application form and the second document is a receipt.

12. An information processing method comprising:
obtaining scanned images consisting of multiple pages by scanning a plurality of documents collectively;
determining a break between different documents in the scanned images;
in a case when a first document indicated by the page preceding the break and a second document indicated by the page following the break in the scanned images do not satisfy a predetermined condition indicating related documents, dividing the scanned images at the break to generate files so that the first document and the second document are separated;
in a case when the first document and the second document, that is not the same document as the first document, satisfy the predetermined condition, combining the first document indicated by the page preceding the break and the second document indicated by the page following the break; and generating a filename for each of one or more files generated from the scanned images by using at least a character string indicating a type of a document corresponding to the file, wherein, based on a result of comparing a character string indicating a first item included in the first document with a character string indicating a second item included in the second document, it is determined whether the predetermined condition is satisfied, wherein the first item is a named entity included in the first document, and wherein the second item is a named entity included in the second document, and wherein the comparing is carried out using a trained model.

13. A non-transitory computer-readable storage medium storing a program that causes a computer to perform an information processing method, the information processing method comprising:

obtaining scanned images consisting of multiple pages by scanning a plurality of documents collectively;

determining a break between different documents in the scanned images;

in a case when a first document indicated by the page preceding the break and a second document indicated by the page following the break in the scanned images do not satisfy a predetermined condition indicating related documents, dividing the scanned images at the break to generate files so that the first document and the second document are separated;

in a case when the first document and the second document, that is not the same document as the first document, satisfy the predetermined condition, combining the first document indicated by the page preceding the break and the second document indicated by the page following the break; and generating a filename for each of one or more files generated from the scanned images by using at least a character string indicating a type of a document corresponding to the file, wherein, based on a result of comparing a character string indicating a first item included in the first document with a character string indicating a second item included in the second document, it is determined whether the predetermined condition is satisfied, wherein the first item is a named entity included in the first document, and wherein the second item is a named entity included in the second document, and wherein the comparing is carried out using a trained model.

* * * * *